United States Patent

Wennerberg

[15] 3,662,968

[45] May 16, 1972

[54] TAPE GUIDE FOR WINDING MACHINES

[72] Inventor: Gunnar Wennerberg, 1641 Poppy Way, San Jose, Calif. 95129

[22] Filed: Apr. 1, 1970

[21] Appl. No.: 24,595

[52] U.S. Cl. ....... 242/76
[51] Int. Cl. ....... B65h 27/00
[58] Field of Search ....... 242/75.2, 76; 226/196

[56] References Cited

UNITED STATES PATENTS

| | | | |
|---|---|---|---|
| 3,222,007 | 12/1965 | Schmuck | 242/76 X |
| 1,616,926 | 2/1927 | Scott | 242/76 |
| 2,608,357 | 8/1952 | Brearton | 242/76 |

OTHER PUBLICATIONS

IBM Technical Disclosure Bulletin, Vol. 2, No. 4 December 1959, " Tape Straightener," C. J. Keller.

*Primary Examiner*—George F. Mautz
*Assistant Examiner*—Edward J. McCarthy
*Attorney*—Alan H. MacPherson

[57] ABSTRACT

A device for use in removing curls, loops, twists or snags from tapes being wound comprises a spindle suitable for being mounted on a tape winder, with two substantially U-shaped jaws protruding from the spindle. Each jaw contains a curved point at the bottom of the U. Tape to be wound is passed between the two jaws and then between the two legs of one jaw and partially around the spindle. The curved point of one jaw prevents irregularities in the tape from passing between the jaws, while the two legs of the jaw through which the tape is passed prevent the tape from slithering from side to side during winding.

7 Claims, 5 Drawing Figures

Patented May 16, 1972 3,662,968

INVENTOR.
GUNNAR WENNERBERG
BY Alan H. MacPherson
ATTORNEY

TAPE GUIDE FOR WINDING MACHINES

BACKGROUND OF THE INVENTION

1. Field of the Invention.

This invention relates to machines for winding tapes and in particular to a device for removing loops, folds, twists and curls from tapes being rolled up from random storage.

2. Background of the Invention.

Tapes are used for many different purposes. For example, paper tapes are used in cash registers to record the amount of each sale, punched paper tapes are used to control a wide variety of machines, to input data directly into computers and for data transmission and storage. Magnetic tapes are used to record information.

One problem in using tapes of any kind is that to handle and analyze the tapes, the tapes must be rolled and unrolled, usually on reels. Numerous machines have been proposed to transfer tapes from one reel to a second reel. However, punched paper tapes used for certain types of computers, cash register tapes and program tapes used in production control and data processing often are still stored randomly in bins or allowed to cascade across floors and tables during analysis or while being punched. Then, the tapes must be rolled up in preparation for storage or shipping. Rolling such tapes is tedious and time-consuming. Typically, such tapes are rolled by winding the tapes around a finger or pencil.

While several devices, both hand-operated and motor-driven, have been proposed to wind such tapes, these devices all suffer from one defect. During random storage, folds, loops, twists and curls develop in the tape, and when the tape is wound around a spindle, for example, the folds, loops, twists and curls snag. With a motor-driven tapewinder, when the tape snags, the tape often breaks or rips before the winding can be stopped. Hand-driven tapewinders are more flexible in this regard, but still require careful attention on the part of the operator to prevent tearing or breaking of the tape during winding.

SUMMARY OF THE INVENTION.

This invention substantially overcomes the tearing and breaking of tapes during the winding of such tapes from random storage into rolls.

According to this invention, the tape being wound is passed through two closely spaced parallel straightening jaws. The straightening jaws protrude from a spindle rigidly fixed to the winder parallel to the rotable spindle on which the tape is being wound. Each jaw is constructed of thick wire and possesses a modified U-shape with the two legs of the U protruding from, and being securely fastened to, the rigidly attached spindle.

The tape to be wound is fed between the two jaws, passed up through or down through one of the jaws between its legs and then partially around the spindle to which the jaws are attached. Other spindles usually are provided on the winder for guiding the tape before it reaches the rotable spindle on which the tape is to be wound.

The two jaws are somewhat pointed and the distance between the parallel portions of the two legs of a given jaw is approximately equal to the width of the tape. The jaws restrain the paper from lateral motion during the winding operation and the somewhat pointed end of one of the jaws effectively removes curls, loops, folds or twists from the tape.

An important feature is the guidance provided the tape as it passes up or down through the jaws. This guidance action keeps the tape well centered at the tip of the jaws, allowing the jaws to perform their straightening action in an efficient manner.

The device of this invention makes it possible to wind tapes from random storage very rapidly without concern for breaking, tearing or snagging the tape.

DETAILED DESCRIPTION.

Figures 1, 3:
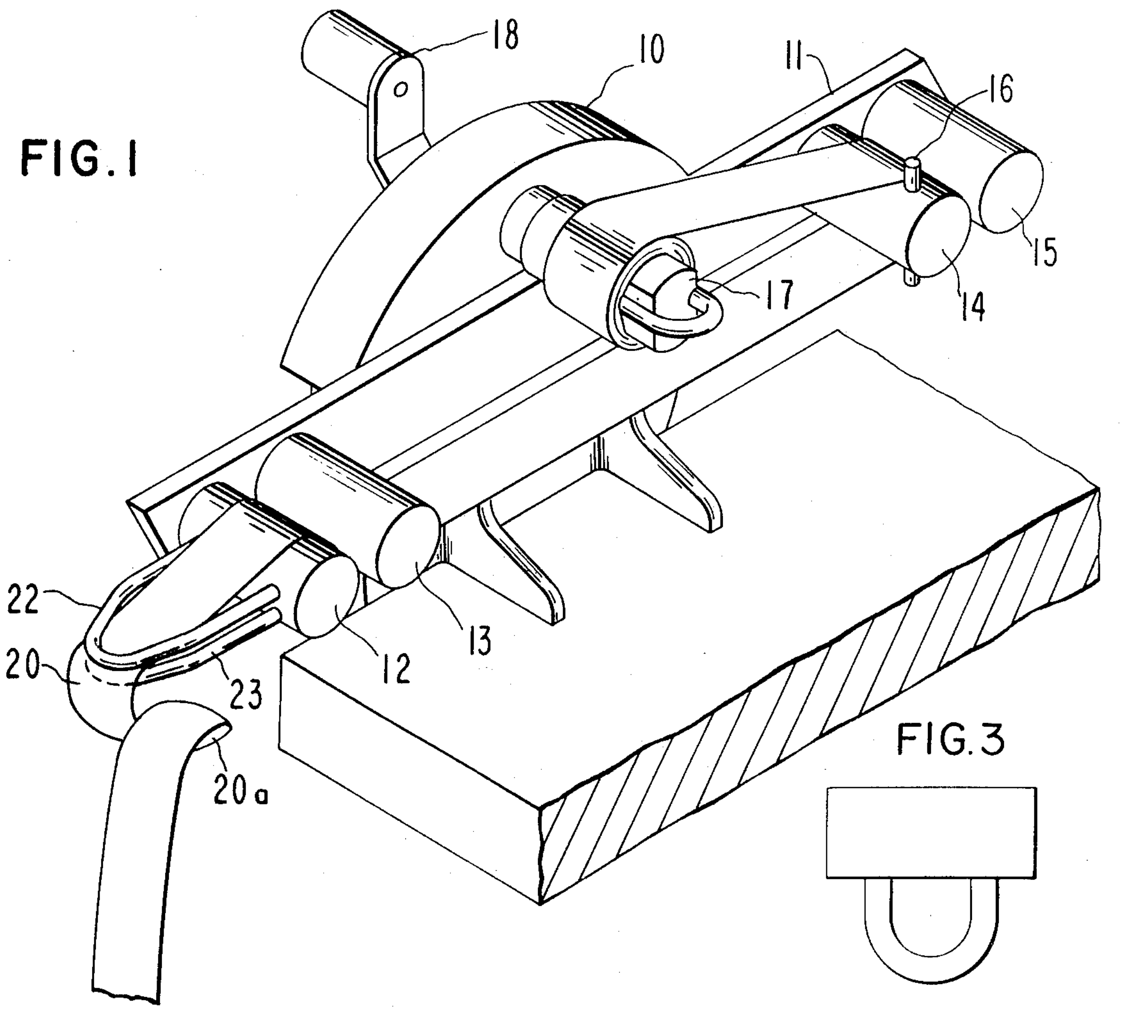
FIG. 1 shows a tape winder using the device of this invention.
FIG. 3 shows another embodiment of this invention.

A universal tape winder of a type useful in this invention is disclosed in copending patent application Ser. No. 868,674, filed on Oct. 24, 1969 by Gunnar Wennerberg and Paul Westin. For convenience, a tape winder similar to the winders shown in this earlier filed patent application is shown in FIG. 1. The winder in FIG. 1 differs slightly, however, from the winder disclosed in the earlier-filed application by containing not only a rotable winding spindle 17 but four additional spindles attached to horizontal support arm 11. Arm 11 is rigidly mounted on housing 10. Housing 10 contains gears or other drive mechanism for connecting rotating spindle 17 to handle 18. While the structure shown in FIG. 1 is hand-operated, of course, if desired, this structure could be motor-operated. Other winders can, of course, be used with the jaws of this invention.

A tape 20 to be wound from random storage is first fed between jaws 22 and 23 mounted in spindle 12. Spindle 12 is rigidly attached to support arm 11. The tape is then passed between the two legs of one of the jaws, jaw 22, as shown, fed over the top of spindle 12, between spindles 12 and 13 and passed along the bottom of spindle 13. The tape is then passed up between spindles 14 and 15 and attached to spindle 17 by a clip. A suitable clip for attaching tape 20 to spindle 17 is shown in the above-cited, copending application. The operator then turns handle 18, and tape 20 is wound from storage onto spindle 17. Spur 16 mounted in spindle 14 prevents tape 20 from moving laterally off spindle 14 while being wound. In addition, the legs of jaw 22 prevent tape 20 from moving off spindle 12.

Loops, twists, curls or folds in tape 20, such as loop **20*a*, commonly would snag or bind the tape while it was being wound. Usually the winding must be done with great care to ensure that such conditions do not break or tear the tape. According to this invention, however, loop 20*a* is prevented by jaws 22 and 23 from travelling with the tape through the jaws and past spindle 12**.

Figure 2A:
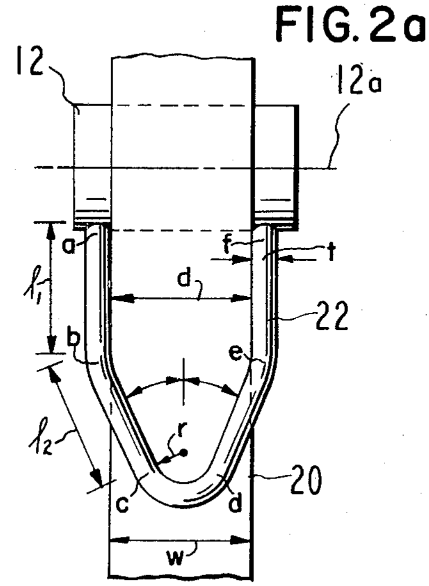
FIGS. 2*a*, 2*b* and 2*c* show top, side, and end views of the tape straightening jaws of this invention
Figure 2B:
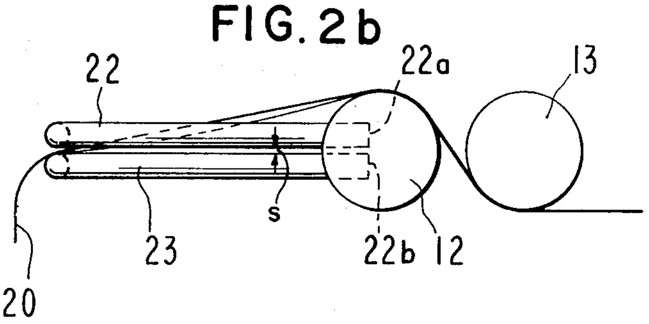
Figure 2C:
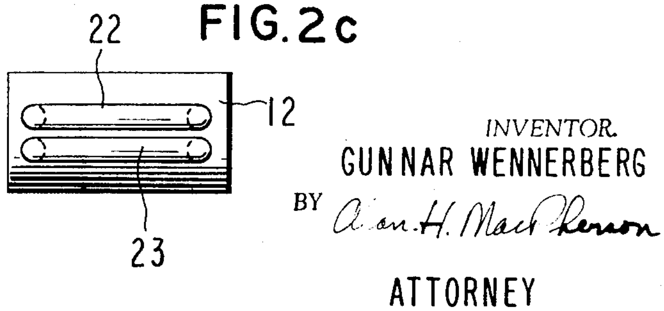

As shown in FIGS. 2*a* through 2*c*, jaws 22 and 23 consist of substantially U-shaped pieces of wire, the ends of which are securely and firmly mounted in holes in spindle 12. These jaws have a thickness of approximately one-eighth to three-sixteenths inches (although their thickness is not particularly critical), and protrude in a horizontal plane from spindle 12 for a distance $l_1$, perpendicular to the center axis **12*a* of spindle 12. The jaws then bend in a horizontal plane to make a selected angle for a distance $l_2$ with the perpendicular to the center line 12*a* of spindle 12. After the distance $l_2$, the jaws bend approximately circularly with a radius $r$ (although curves other than sections of circles can also be used here) and then head back towards spindle 12 for the distance $l_2$, again making the selected angle with a perpendicular to center line 12*a* of spindle 12. At point $e$ the jaws bend again and head directly towards spindle 12 joining spindle 12 perpendicular to center line 12*a*. The distance $d$ between the portions of jaws 22 and 23 protruding perpendicularly from spindle 12** is selected to be substantially equal to the width $w$ of the tape being wound. Alternative structure has a curved point attached directly to the two parallel legs of each jaw, eliminating angled sections *bc* and *de* shown in FIG. 2*a*. Although studies indicate that the distance $d$ can be larger than the width $w$, such jaws do not work quite as satisfactorily as do jaws designed such that the distance $d$ is substantially equal to the width $w$. In wider jaws, tape 20 is not rigidly constrained to follow a given path past spindle 12 and thus tends to slither from side to side in the jaws.

While jaws 22 and 23 are shown as having a circular cross-section, other curved cross-sections can also be used. Also, while jaws 22 and 23 are in one embodiment made of metal, a wide variety of materials can be used for these jaws, including teflon, nylon, plastic, and glass. Also, while the jaws are shown and described as protruding substantially horizontally from spindle 12, all that is required is that the jaws protrude from spindle 12 in a direction such that tape 20 does not approach the jaws in a plane parallel to the planes of the jaws.

During the winding of tape 20, this tape approaches the jaws at an angle, as shown. Thus the outermost portion of jaw 23, i.e. the portion between points c and d (FIG. 2*a*), pushes against the tape and prevent any loop such as loop 20*a* (FIG. 1) from passing between the jaws. The distance *s* (FIG. 2*b*) between the bottom of jaw 22 and the top of jaw 23 is selected to be only slightly larger than the thickness of the tape being wound. A typical spacing *s* is on the order of one thirty-second inch. Jaws 22 and 23, being closely spaced with curved, smooth ends, prevent any loops in the tape from passing between the jaws. Such loops are forced to travel along the tape and remain just beyond the ends of the jaws. The jaws, by their curved, protruding shape combined with the restraining forces placed on the outer edges of the tape by the inside edges of the jaws, together with the weight of the tape being wound, prevent the tape from weaving from side to side over spindle 12 and forcibly constrain the tape to a fixed path across this spindle.

As tape 20 moves across the outermost portion of jaw 23 (between points *c* and *d* FIG. 2*a*) the center portion of tape 20 first comes in contact with the top side of the outermost portion of jaw 23. The edge portions of tape 20 then are forced downward by the inside bottom edges of the top jaw 22 after the center portion has travelled a fraction of an inch or so beyond the uttermost portion of jaw 23. Thus, a slightly concave downward cross-section is given the tape by jaws 22 and 23, and this concavity together with the tensile force on the tape due to its weight, gives tape 20 a slight stiffness which, if flat, it would lack. This concavity and stiffness assists jaws 22 and 23 in removing loops such as loop 20*a* from the tape slightly before the tape touches jaw 23.

While one embodiment of this invention has been shown in detail, other embodiments of this invention will be obvious in view of this disclosure. While tape 20 has been shown passing up through jaw 22, tape 20 can alternatively be passed down through jaw 23. A tape so threaded will likewise be straightened by the jaws. In this case, only jaw 23 need be mounted on spindle 12, as jaw 22 is not used.

What is claimed is:

1. A device for use with a tape winder, which comprises a spindle containing two substantially U-shaped jaws protruding from the surface of said spindle, each jaw containing two legs joined by a selectively bent portion of material, said jaws being separated by a selected distance and each jaw being mounted on said spindle by having the unjoined ends of its two legs rigidly attached to said spindle.

2. Structure as in claim 1, wherein each jaw contains a pointed, curved end at the bottom of the U, said curved end being attached by short lengths of material making selected angles with a perpendicular to the center line of said spindle, said two legs being parallel and rigidly attached to said spindle.

3. Structure as in claim 1, wherein said two jaws are located in parallel.

4. Structure as in claim 3, wherein said spindle is mounted on a tape winder such that said two jaws protrude from said spindle in a substantially horizontal plane.

5. Structure as in claim 2, wherein the distance between said two parallel legs is approximately equal to the width of the tape to be wound.

6. Structure as in claim 1, wherein each of said jaws contains a curved point attached directly to the two legs of the jaw.

7. Structure as in claim 1 wherein said spindle is mounted on a tape winder.

* * * * *

UNITED STATES PATENT OFFICE

CERTIFICATE OF CORRECTION

Patent No. 3,662,968 Dated May 16, 1972

Inventor(s) Gunnar Wennerberg

It is certified that error appears in the above-identified patent and that said Letters Patent are hereby corrected as shown below:

Claim 2, line 3, between "attached" and "by" should read -- to said two legs --.

Signed and sealed this 31st day of October 1972.

(SEAL)
Attest:

EDWARD M.FLETCHER,JR.
Attesting Officer

ROBERT GOTTSCHALK
Commissioner of Patents